United States Patent Office 3,787,388
Patented Jan. 22, 1974

3,787,388
THIAZOLYL-AZO-TETRAHYDROQUINOLINE COMPOUNDS
Max A. Weaver and David J. Wallace, Kingsport, Tenn., assignors to Eastman Kodak Company, Rochester, N.Y.
No Drawing. Continuation of abandoned application Ser. No. 590,188, Oct. 28, 1966. This application Apr. 19, 1972, Ser. No. 245,390
Int. Cl. C09b 29/36
U.S. Cl. 260—155      8 Claims

ABSTRACT OF THE DISCLOSURE

Thiazolyl-azo-tetrahydroquinoline compounds in which the nitrogen atom of the tetrahydroquinoline coupling component is substituted with a group having the formula

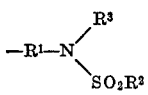

wherein $R^1$ is alkylene and $R^2$ and $R^3$ each is alkyl, cycloalkyl or aryl. The disclosed compounds are useful for dyeing hydrophobic textile materials such as polyester fibers.

---

This application is a continuation of our application Ser. No. 590,188, filed Oct. 28, 1966, for "Azo Compounds for Hydrophobic Fibers," now abandoned.

This invention relates to certain novel azo compounds and their use as dyes for hydrophobic textile fibers, yarns, and fabrics.

The azo compounds of our invention have the general formula

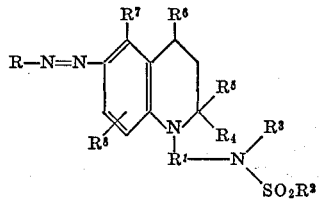

wherein

R represents a 2-thiazolyl group;
$R^1$ represents an alkylene group;
$R^2$ represents an alkyl group, a cycloalkyl group, or a monocyclic carbocyclic aromatic group of the benzene series;
$R^3$ represents an alkyl group or a cycloalkyl group;
$R^4$, $R^5$ and $R^6$ are the same or different and each represents hydrogen or lower alkyl; and
$R^7$ and $R^8$ are the same or different and each represents hydrogen, lower alkyl, lower alkoxy, halogen, or lower alkanoylamido.

The compounds of the invention are useful as dyes for hydrophobic textile materials and, when applied thereto by conventional dyeing techniques, the azo compounds display excellent fastness properties, particularly light fastness.

Typical of the 2-thiazolyl groups represented by R are thiazol-2-yl,
5-nitrothiazol-2-yl,
5-chlorothiazol-2-yl,
5-cyanothiazol-2-yl,
5-acetamidothiazol-2-yl,
4-methyl-5-nitrothiazol-2-yl,
4-methyl-5-cyanothiazol-2-yl,
4-methyl-5-methylsulfonylthiazol-2-yl,
4-ethoxycarbonylthiazol-2-yl,
5-chlorothiazol-2-yl, etc. Preferred groups represented by R can be characterized by the formula

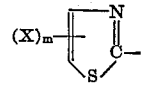

wherein X represents hydrogen, lower alkyl, e.g. methyl, ethyl, butyl; substituted lower alkyl such as haloalkyl, e.g. chloromethyl, trifluoromethyl, cyanoalkyl, e.g. β-cyanoethyl, nitroalkyl, e.g. β-nitroethyl, hydroxyalkyl, e.g. β-hydroxyethyl; β-cyanoethoxy, haloalkoxy, e.g. β-bromoethoxy; alkoxyalkyl, e.g. β-methoxyethyl; phenoxyalkyl, e.g. β-phenoxyethyl; lower alkoxy, e.g. methoxy, ethoxy; substituted lower alkoxy such as cyanoalkoxy, e.g. phenylalkoxy, e.g. benzyloxy; lower alkanoylamido, e.g. acetamido; nitro; halogen, e.g. chloro, bromo; cyano; lower alkylsulfonyl, e.g. methylsulfonyl; substituted lower alkylsulfonyl e.g. cyanoethylsulfonyl; carbamoyl; N-lower alkyl carbamoyl, e.g. N,N-dimethylcarbamoyl; hydroxyl; aryl; e.g. phenyl; lower alkanoyl, e.g. formyl; acetyl; benzamido; benzylamino; N-alkylarylamino, e.g. N-methylphenylamino; lower alkoxycarbonyl, e.g. ethoxycarbonyl, sulfamoyl; N-lower alkyl sulfamoyl, e.g. N-ethylsulfamoyl; lower alkylsulfonamido, e.g. methylsulfonamido; lower dicarboxylicacidimido, e.g. succinimido; thiocyanato; lower alkylthio, e.g. methylthio; combinations thereof; and $m$ represents 1 or 2. As used in the above description and hereinafter, the term lower is used in its conventional sense to mean an alkyl moiety having up to about 4 carbon atoms.

The alkylene group represented by $R^1$ can be straight or branched chain, unsubstituted or substituted alkylene of up to about 8 carbon atoms. Preferably, $R^1$ represents a lower alkylene group having up to about 4 carbon atoms. Examples of the alkylene groups represented by $R^1$ are ethylene, propylene, iso-propylene, n-butylene, sec-butylene, hexamethylene, haloalkylene, e.g. 2-chloropropylene, 2-bromopropylene, chloroethylene, hydroxyalkylene, e.g. 2-hydroxypropylene, hydroxyethylene, lower alkanoyloxyalkylene, e.g. 2-acetoxypropylene, etc.

The alkyl groups represented by $R^2$ and $R^3$ can contain up to about 8 carbon atoms and can be straight or branch chain, unsubstituted or substituted. Typical alkyl groups represented by $R^2$ and $R^3$ are methyl, ethyl, propyl, isopropyl, butyl, hexyl, 2-ethylhexyl, hydroxyalkyl, e.g. hydroxyethyl, polyhydroxyalkyl, e.g. 2,3-dihydroxypropyl, lower alkoxyalkyl, e.g. β-methoxyethyl, nitroalkyl, e.g. β-nitroethyl, cyanoalkyl, e.g. β-cyanoethyl, cyanoalkoxyalkyl, e.g. β-cyanoethoxyethyl, lower alkanoyloxyalkyl, e.g. β-acetoxyethyl, lower alkoxycarbonyl, e.g. β-ethoxycarbonylethyl, haloalkyl, e.g. β-chloroethyl, gamma-chloropropyl, β-bromoethyl, hydroxyhalogenoalkyl, e.g. gamma-chloro-β-hydroxypropyl, lower alkanoylamidoalkyl, e.g. β-acetamidoehtyl, carbamoylalkyl, e.g. β-carbomoylethyl, N-lower alkylcarbamoylalkyl, e.g. β-N-methylcarbamoylethyl; lower alkylsulfonylalkyl, e.g. β-methylsulfonylethyl, lower dicarboxylic acid imidoalkyl, e.g. succinimidoethyl; aryl, e.g. benzyl; benzoyloxy, phenoxyalkyl, e.g. β-phenoxyethyl; lower alkylsulfonamidoalkyl, e.g. methylsulfonamidoethyl; N-phenylcarbamoyloxy; etc. The alkyl group represented by $R^2$ and $R^3$ are preferably lower alkyl e.g. up to about 4 carbon atoms. However, when the alkyl group is substituted by a carbon containing substituent, e.g. alkoxy, the preferred substituted alkyl group can contain up to about 8 carbon atoms, e.g. delta-butoxybutyl. Especially preferred compounds of the invention are those wherein $R^2$ represents lower alkyl and $R^3$ represents substituted lower alkyl. $R^2$ and $R^3$ can also represent cycloalkyl having about 5 to 6 carbon atoms such as, for example, cyclohexyl.

The monocyclic carbocyclic aromatic groups of the benzene series represented by $R^2$ include, for example, phenyl and phenyl substituted with lower alkyl, lower alkoxy, nitro, halogen, etc. Illustrative of such groups are phenyl, p-tolyl, m-nitrophenyl, o,p-dichlorophenyl, and p-anisyl.

Typical of the lower alkyl groups represented by $R^4$, $R^5$, $R^6$, $R^7$ and $R^8$ are methyl, ethyl, propyl, isopropyl and butyl. Examples of lower alkoxy groups represented by $R^7$ and $R^8$ are methoxy, ethoxy, and butoxy. Chloro and bromo are typical halogen atoms represented by $R^7$ and $R^8$. Typical lower alkanoylamido groups represented by $R^7$ and $R^8$ are acetamido, propionamido and butyramido.

Generally, the groups X, $R^4$, $R^5$, $R^6$, $R^7$ and $R^8$ and the substituents on the groups represented by $R^1$, $R^2$ and $R^3$ do not materially affect the usefulness of the compounds of the invention as dyes for hydrophobic textile fibers. These groups and substituents function primarily as auxochrome groups to control the shade of the compounds, the basic color of which is attributable to the thiazolylazotetrahydroquinoline nucleus as is well known in the art. However, when $R^3$ is substituted alkyl, the compounds of the invention display unexpectedly good fastness to light and sublimation.

The azo compounds of the invention are prepared by coupling diazonium salts of 2-aminothiazoles having the formula (II)            $RNH_2$

with a tetrahydroquinoline coupling components having the formula (III)

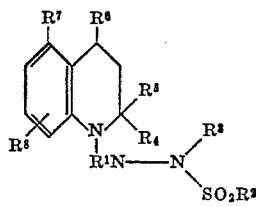

wherein R, $R^1$, $R^2$, $R^3$, $R^4$, $R^5$, $R^6$, $R^7$ and $R^8$ are defined above.

PREPARATION OF THE COUPLERS

The coupling components having the Formula III are prepared according to methods well known in the art. The following example illustrates one method of preparing the couplers.

Example A 3.5 g. (0.025 mol) of 1-(2-chloroethyl)-1,2,3,4-tetrahydro - 2,2,4,7-tetramethylquinoline, 3.5 g. (0.025 mol) N-2-hydroxyethylmethanesulfonamide, 3.5 g. (0.025 mol) potassium carbonate, and 50 cc. of dimethyl formamide are refluxed together for 2 hours. The reaction mixture is drowned into water, and the product extracted with chloroform. The chloroform is separated and evaporated to give 7.5 g. of the product having the formula

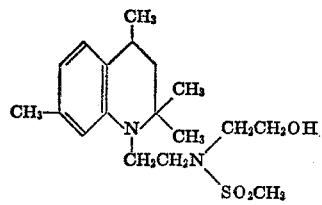

By substituting equimolar quantities of other tetrahydroquinolines and sulfonamides, the couplers conforming to Formula III can be prepared employed the procedure described above.

PREPARATION OF THE DYES

Example 1

(a) Diazotization.—2.9 g. of 2-amino-5-nitrothiazole are stirred in 60 cc. of water and 32 cc. of concentrated sulfuric acid. The resulting solution is cooled to —10° C. and a solution of 1.4 g. of $NaNO_2$ in 10 cc. of water is added at —10° C. to—5° C. Stirring at —5° C. is continued for 10 minutes.

(b) Coupling.—7.1 g. of the coupler prepared in Example A is dissolved in 100 cc. of 15% aqueous sulfuric acid. The coupling solution is cooled in an ice bath and the diazonium solution from Example 1(a) is added. After an hour, the mixture is drowned in water, filtered, washed with water, and air dried. The product dyes cellulose acetate and polyester fibers a brilliant blue shade having excellent fastness properties. It has the structure:

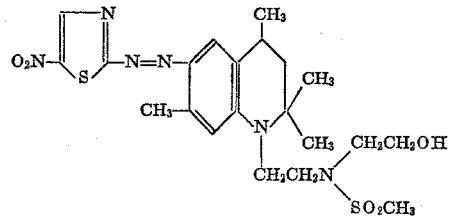

Example 2

2.9 g. of 2-amino-5-nitrothiazole are diazotized and coupled with 6.5 g. of the coupler 1-(N-methyl-N-methylsulfonylaminoethyl)-1,2,3,4-tetrahydro - 2,2,4,7 - tetramethylquinoline according to the procedure of Example 1 to yield a product which imparts a blue shade to cellulose acetate and polyester fibers. It has the formula

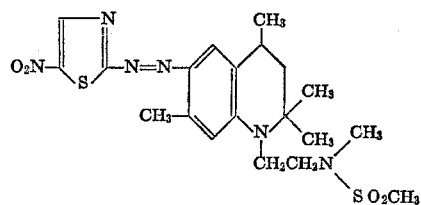

Example 3

2.9 g. of 2-amino-5-nitrothiazole are diazotized and coupled with 5.94 g. of the coupler 1-(N-methyl -N-methylsulfonylaminoethyl) - 1,2,3,4 - tetrahydro-2,7-dimethylquinoline according to the procedure employed in Example 1. The product dyes cellulose acetate and polyester fibers a brilliant blue shade of excellent fastness properties. The dye has the formula

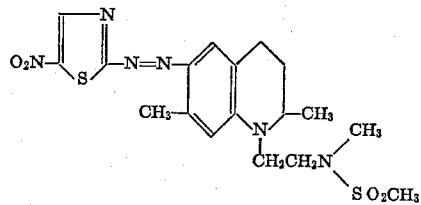

Example 4

2.9 g. of 2-amino-5-nitrothiazole are diazotized and coupled with 6.54 g. of the coupler 1-(N-2-hydroxyethyl-N-methylsulfonylaminoethyl) - 1,2,3,4 - tetrahydro - 2,7-dimethylquinoline according to to the procedure of Example 1. The product obtained gives brilliant blue dyeings on cellulose acetate and polyester fibers having excellent fastness properties. It has the formula

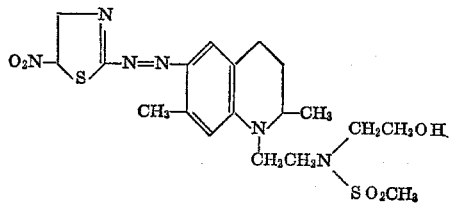

Example 5

2.9 g. of 2-amino-5-nitrothiazole are diazotized and coupled with 7.94 g. of the coupler 1-(N-2-acetoxyethyl-N-methylsulfonylaminoethyl) - 1,2,3,4 - tetrahydro-2,2,4,7-tetramethylquinoline as described in Example 1 to yield a product which imparts blue shades to cellulose acetate and polyester fibers of excellent fastness properties. This dye has the formula

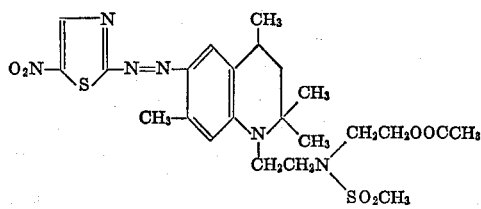

The compounds set forth in following examples are similarly prepared according to the procedure employed in Example 1. Equimolar quantities (0.02 mol) of the appropriate 2-aminothiazole of Formula II and the appropriate coupling component having Formula III are reacted to yield azo compounds having the formula

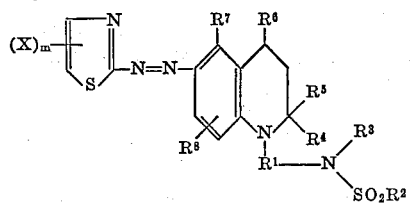

The color given for each compound refers to dyeings on polyester fibers.

for dyeing such hydrophobic materials, they should be free of water-solubilizing groups such as sulfo and carboxyl. In general, the compounds of the invention have excellent fastness, for example, to light, washing, gas (atmospheric fumes) and sublimation. The compounds display exceptionally good sublimation and light-fastness when used as dyes on polyesters.

As described above, the present compounds have the characteristic structure of Formula I. This distinctive structure imparts unexpected properties to the compounds, including the above-described light fastness and sublimation resistance. Thus, we have found the compounds of the invention to possess properties superior to similar but distinct and different compounds when used as dyes and tested by methods such as described in the A.A.T.C. Technical Manual, 1965 edition.

The compounds of the invention can be used for dyeing hydrophobic fibers such as linear polyester, cellulose ester, acrylic, polyamide, etc., fibers in the manner described in U.S. Pat. 2,880,050, 2,782,187, 2,757,064 and 3,043,827. The following example illustrates a method by which the compounds of the invention can be used to dye polyester textile materials.

Example 21

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. Then, 3 cc. of "Dacronyx" (a chlorinated benzene emulsion) are added and 10 grams of a textile fabric made of poly(ethylene terephthalate) polyester fibers are entered. The fabric is worked 10 min-

| Ex. No. | X | $R_7$–$R_8$ | $R_4$–$R_5$–$R_6$ | $R_1$ | $R_2$ | $R_3$ | Color |
|---|---|---|---|---|---|---|---|
| 6 | 5-$NO_2$ | None | None | —$CH_2CH_2$— | —$CH_3$ | —$C_2H_5$ | Blue. |
| 7 | 5-$NO_2$ | None | None | —$(CH_2)_3$— | —$C_2H_5$ | —$C_2H_5$ | Do. |
| 8 | 5-$NO_2$ | 7-$OCH_3$ | 2-$CH_3$ | —$(CH_2)_3$— | —$C_2H_5$ | —$C_2H_4Cl$ | Do. |
| 9 | 5-$NO_2$ | 7-Cl | 2-$CH_3$ | —$(CH_2)_3$— | —$CH_2CH_2OCH_3$ | —$C_2H_4OCH_3$ | Do. |
| 10 | 5-$NO_2$ | 5-$CH_3$ | 2-$CHCH_3$ \| $CH_3$ | $CH_3$ \| —$CH_2CH$ | —$CH_2CH_2Cl$ | —$C_2H_4OCOCH_3$ | Do. |
| 11 | 5-$NO_2$ | 8-$CH_3$ | Same as above | Same as above | —$CH_2CH_2OCOCH_3$ | —$C_2H_4OCOC_6H_5$ | Do. |
| 12 | 5-$NO_2$ | 7-$NHCOCH_3$ | 2-$CH_3$ | —$CH_2CH_2$— | —$C_6H_5$ | —$C_4H_9$ | Do. |
| 13 | 5-$NO_2$ | 7-$CH_3$ | 2-$CH_3$ | —$CH_2CH_2$— | —$C_6H_4$—$CH_3$ | —$C_4H_9$ | Do. |
| 14 | 4-$CF_3$ | 7-$CH_3$ | 2-$CH_3$ | —$CH_2CH_2$— | —$CH_3$ | —$C_2H_4CN$ | Violet. |
| 15 | 4-$CO_2C_2H_5$ | 7-$CH_3$ | 2-$CH_3$ | —$CH_2CH_2$— | —$CH_3$ | —$C_2H_4CONH_2$ | Do. |
| 16 | 4-$NHCOCH_3$ | 7-$CH_3$ | 2-$CH_3$ | —$CH_2CH_2$— | —$CH_3$ | OH \| —$CH_2CHCH_2Cl$ | Do. |
| 17 | 4-$C_6H_5$ | 7-$CH_3$ | 2-$CH_3$ | Cl \| —$CH_2CH$—$CH_2$— | —$CH_3$ | —$C_2H_4OCONHC_6H_5$ | Do. |
| 18 | 5-Cl | 7-$CH_3$ | 2-$CH_3$ | Same as above | —$CH_3$ | —$C_2H_4CO_2C_2H_5$ | Do. |
| 19 | 4-$CH_3$, 5-$COCH_3$ | 7-$CH_3$ | 2-$CH_3$ | —$CH_2CH_2$— | —$CH_3$ | —$C_2H_4NHCOCH_3$ | Do. |
| 20 | 5-$SO_2C_4H_9$ | 7-$CH_3$ | 2-$CH_3$ | —$CH_2CH_2$— | —$CH_3$ | —$C_2H_4CN$ | Blue. |
| 21 | 5-CN | 7-$CH_3$ | 2-$CH_3$ | —$CH_2CH_2$— | —$CH_3$ | —$C_2H_4SO_2SH_3$ | Do. |
| 22 | 5-$SO_2CH_3$ | 7-$CH_3$ | 2-$CH_3$ | —$CH_2CH_2$— | —$CH_3$ | —$C_2H_4SO_2CH_3$ | Do. |
| 23 | 5-$NO_2$ | 7-$CH_3$ | 2-$CH_3$ | —$CH_2CH_2$— | —$CH_3$ | —⟨S⟩ | Do. |

The thiazolylazo compounds of the invention can be used for dyeing textile materials, including protein and synthetic polymer fibers, yarn and fabrics, giving a variety of fast brilliant pink to violet shades when applied thereto by conventional dye methods. The compounds have high affinity for cellulose ester, polyester and nylon fibers. When the thiazolylazo compounds are used utes without heat and then for 10 minutes at 80° C. The dye bath is then brought to the boil and held at the boil for one hour. Following this, the fabric is rinsed in warm water, then scoured in aqueous 0.2% soap, 0.2% soda ash solution. After scouring, the fabric is rinsed with water and dried. When the compounds are used to dye polyamide textile materials, the above described procedure can be employed except the "Dacronxy" dyeing assistant need not be used.

Accordingly, since the thiazolylazo compounds of the invention are water-insoluble, they can be applied from aqueous dispersions in the manner of the so-called "dispersed dyes." However, coloration can also be effected, for example, by incorporating the compounds into the spinning dope and spinning the fiber as usual. The compounds of the invention are not necessarily equivalents when used as dyes. The degree of dye affinity varies, for example, depending upon the material being dyed and the formula of the thiazolylazo compound. Thus, for example, all the dyes will not have the same degree of affinity for the same material.

Polymeric linear polyester materials of the terephthalate type are illustrative of the linear aromatic polyester textile materials than can be dyed with the new compounds of our invention. Examples of such linear polyester materials are those prepared from ethylene glycol and dimethylterephthalate and those prepared from 1,4-cyclohexanedimethanol and dimethylterephthalate. Polyester textile materials prepared from 1,4-cyclohexanedimethanol and dimethylterephthalate are more particularly described in U.S. Pat. 2,901,446. Poly-(ethylene terephthalate) fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C.

Examples of the polyamide fibers that can be dyed with the compounds of the invention are those consisting of nylon 66, made by the polymerization of adipic acid and hexamethylenediamine, nylon 6, prepared from epsilon-aminocaproic acid lactam, and nylon 8.

The invention has been described in considerable detail with particular reference to certain preferred embodiments thereof, but it will be understood that variations and modifications can be effected within the spirit and scope of the invention as described above and as defined in the appended claims.

We claim:

1. A compound having the formula

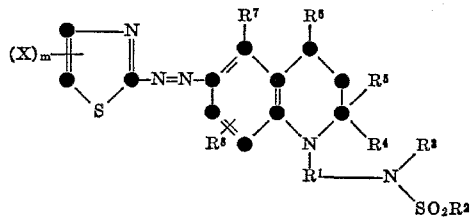

wherein

X is hydrogen, lower alkyl, lower alkoxy, lower alkanoyl, lower alkanoylamido, nitro, chlorine, bromine, lower alkylsulfonyl, trifluoromethyl, carbamoyl, lower alkoxycarbonyl, sulfamoyl, or phenyl;

$m$ is 1 or 2;

$R^1$ is lower alkylene, lower chloroalkylene, lower bromoalkylene, lower hydroxyalkylene, lower alkanoyloxy-lower-alkylene;

$R^2$ is lower alkyl, lower alkoxy-lower-alkyl, lower chloroalkyl, lower bromoalkyl, lower alkanoyloxy-lower-alkyl, cyclohexyl, benzyl, phenyl, lower alkylphenyl, lower alkoxyphenyl, chlorophenyl, bromophenyl, or nitrophenyl;

$R^3$ is lower alkyl; lower alkyl substituted with hydroxy, lower alkanoyloxy, chlorine, bromine, benzoyloxy, cyano, carbamoyl, lower alkylcarbamoyl, phenylcarbamoyloxy, lower alkoxycarbonyl, lower alkanoylamido, lower alkylsulfonyl, lower alkoxy, succinimido, or phenoxy; cyclohexyl; benzyl; phenyl; or phenyl substituted with lower alkyl, lower alkoxy, chlorine, bromine or nitro;

$R^4$, $R^5$ and $R^6$ are the same or different and each is hydrogen or lower alkyl; and $R^7$ and $R^8$ are the same or different and each is hydrogen, lower alkyl, lower alkoxy, chlorine, bromine or lower alkanoylamido;

wherein lower designates a carbon content of from 1 to about 4 carbon atoms.

2. A compound according to claim 1 wherein

X represents hydrogen, lower alkyl, trifluoromethyl, lower alkoxycarbonyl, nitro, lower alkanoylamido, phenyl, chlorine, bromine, lower alkanoyl, cyano, or lower alkylsulfonyl;

$m$ is 1;

$R^1$ is lower alkylene;

$R^2$ is lower alkyl, cyclohexyl, phenyl, or lower alkylphenyl; and $R^3$ is lower alkyl, lower hydroxyalkyl, lower chloroalkyl, lower bromoalkyl, lower alkanoyloxy-lower-alkyl, lower alkylsulfonyl-lower-alkyl, lower cyanoalkyl, lower alkanoylamido-lower-alkyl, lower alkoxycarbonyl-lower-alkyl, lower carbamoylalkyl, lower benzoyloxyalkyl, or cyclohexyl.

3. A compound as defined by claim 2 wherein

X is 5-nitro and $m$ is 1;

$R^2$ is lower alkyl;

$R^3$ is lower alkyl, lower hydroxyalkyl, lower chloroalkyl, lower bromoalkyl, lower cyanoalkyl, or lower alkanoyloxy-lower alkyl; and $R^4$, $R^5$, $R^6$, $R^7$ and $R^8$ are the same or different and each is hydrogen or lower alkyl.

4. A compound as defined in claim 1 having the formula

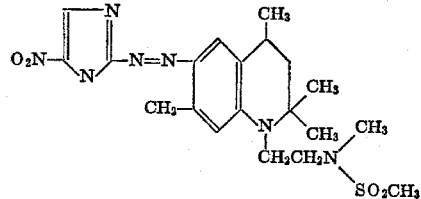

5. A compound as defined in claim 1 having the formula

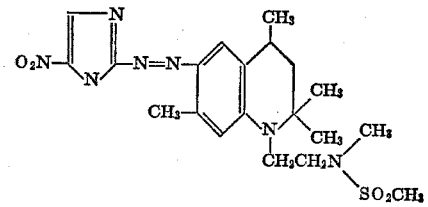

6. A compound as defined in claim 1 having the formula

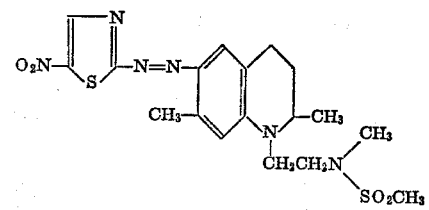

7. A compound as defined in claim 1 having the formula

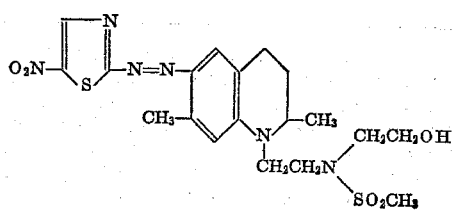

8. A compound as defined in claim 1 having the formula
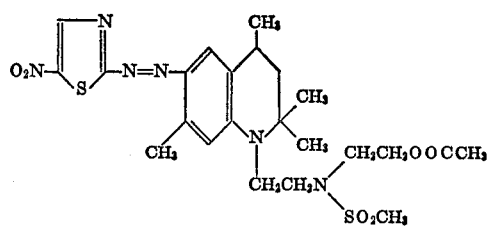
References Cited
UNITED STATES PATENTS
| 3,109,840 | 11/1963 | Beffa et al. | 260—149 |
| 3,139,420 | 6/1964 | Beffa et al. | 260—149 |
| 3,206,452 | 9/1965 | Straley et al. | 260—155 |
LEWIS GOTTS, Primary Examiner
C. F. WARREN, Assistant Examiner
U.S. Cl. X.R.
8—41 B, 41 C; 260—287 R, 288 R

UNITED STATES PATENT OFFICE
CERTIFICATE OF CORRECTION

Patent No. 3,787,388     Dated January 22, 1974

Inventor(s) Max A. Weaver and David J. Wallace     Page 2

It is certified that error appears in the above-identified patent and that said Letters Patent are hereby corrected as shown below:

Col. 5, line 72, delete "yarn" and insert ---yarns---.

Col. 6, line 24, delete "Example 21" and insert ---Example 24---.

Col. 7, line 1, delete ""Dacronxy"" and insert ---"Dacronyx"---.

Col. 7, line 17, delete "than" and insert ---that---.

Col. 8, Claim 4, delete the formula therein and insert

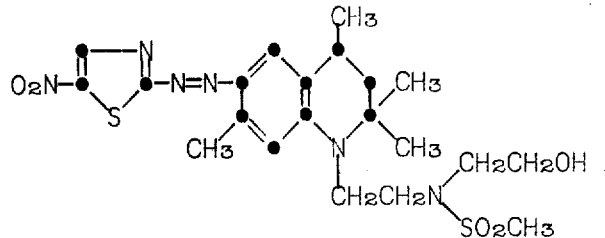

Signed and sealed this 13th day of August 1974.

(SEAL)
Attest:

McCOY M. GIBSON, JR.       C. MARSHALL DANN
Attesting Officer      Commissioner of Patents